United States Patent [19]

Koshiga et al.

[11] 4,013,868
[45] Mar. 22, 1977

[54] METHOD OF MULTIPLE GAS SHIELDED ARC WELDING

[75] Inventors: Fusao Koshiga, Kawasaki; Jinkichi Tanaka; Itaru Watanabe, both of Yokohama, all of Japan

[73] Assignee: Nippon Kokan Kabushiki Kaisha, Tokyo, Japan

[22] Filed: Nov. 19, 1975

[21] Appl. No.: 633,384

[30] Foreign Application Priority Data

Nov. 26, 1974 Japan .......................... 49-135180

[52] U.S. Cl. .......................... 219/137 WM; 219/74
[51] Int. Cl.² .......................... B23K 9/24
[58] Field of Search ...... 219/137 R, 137 WM, 130, 219/73, 74, 145, 146

[56] References Cited

UNITED STATES PATENTS

| | | | |
|---|---|---|---|
| 2,756,311 | 7/1956 | Persson et al. | 219/74 X |
| 2,868,954 | 1/1959 | Skinner et al. | 219/137 R X |
| 3,007,033 | 10/1961 | Newman et al. | 219/137 R |
| 3,278,720 | 10/1966 | Dixon | 219/74 X |
| 3,596,051 | 7/1971 | Nomura | 219/137 R |
| 3,652,823 | 3/1972 | Clemens et al. | 219/130 |
| 3,694,620 | 9/1972 | Gleason | 219/130 |
| 3,704,358 | 11/1972 | Saito et al. | 219/73 |

*Primary Examiner*—Bruce A. Reynolds
*Assistant Examiner*—Clifford C. Shaw

[57] ABSTRACT

In a method of multiple electrode gas shielded arc welding wherein a plurality of electrodes are arranged along the welding seam line of a piece of metal to be welded and continuous gas shielded arc welding of the piece is accomplished simultaneously by the electrodes, the chemical composition of the electrode wire of the electrode or electrode group for depositing a preceeding layer or layers is selected to differ from that of the electrode wire of another electrode or electrode group for depositing a subsequent layer or layers, whereby the chemical composition of the weld metal made by the preceeding welding operation is brought near to that of the weld metal made by the following welding operation and thus the uniform properties are ensured for welding metals at the respective positions in the weld zone.

3 Claims, 3 Drawing Figures

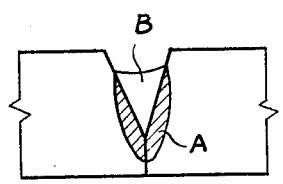
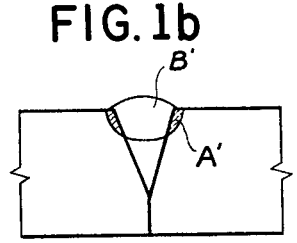
FIG. 2
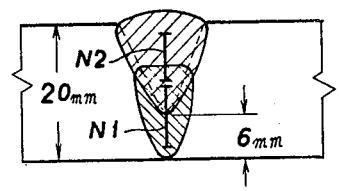

METHOD OF MULTIPLE GAS SHIELDED ARC WELDING

BACKGROUND OF THE INVENTION

The present invention relates to improvements in automatic arc welding processes, and more particularly the invention relates to an improved method of multiple electrode gas shielded arc welding.

The gas shielded arc welding process is one of the automatic arc welding process. In this process, generally a pure gas such as pure argon or pure carbon dioxide gas or a mixed gas comprising mainly argon and a small addition of oxygen or carbon dioxide gas is used to prevent access to oxygen and nitrogen and in this way the arc welding is accomplished. While this process has the advantage of low welding input heat and hence welded joint metals of excellent properties as compared to other arc welding processes such as the submerged arc welding process, it has the disadvantage of low welding efficiency. In view of this fact, a welding method has been used in which two or more electrode wires of the same chemical composition are arranged along the welding seam line of a piece to be welded and the weld metal is continuously deposited in a series of layers by the plurality of electrodes, thereby ensuring an improved welding efficiency. While this method has the effect of considerably improving the welding efficiency, it is also disadvantageous in that the chemical composition of the weld metal made by each of the respective passes such as the first and second passes differ from one another and consequently there results a wide variation in the properties, particularly the impact property of the weld metal at the different positions in the entire weld metal corresponding to the passes, thus making it difficult to obtain a homogeneous weld zone.

SUMMARY OF THE INVENTION

With a view to overcoming the above-mentioned deficiencies of the conventional multiple electrode gas shielded arc welding processes, it is an object of the present invention to provide a method of multiple electrode gas shielded arc welding wherein the electrode wire constituting the leading electrode or electrode group contains deoxidizing elements in amounts different from those of the elements contained in the electrode wire constituting the trailing electrode or electrode group thereby to control the deoxidation reaction of these elements.

It is another object of the present invention to provide a method of multiple electrode gas shielded arc welding wherein the chemical composition of the electrode wire constituting the leading electrode or electrode group is selected to differ from that of the electrode wire constituting the trailing electrode or electrode group to thereby ensure the uniform chemical composition for the weld metal of all the bead layers made by the respective passes.

It is still another object of the present invention to provide a method of multiple electrode gas shielded arc welding wherein the chemical composition of the electrode wire constituting the leading electrode or electrode group is selected to differ from that of the electrode wire constituting the trailing electrode or electrode group thereby to ensure uniform properties for the weld metals made by the respective passes.

To accomplish the above and other objects, in accordance with the present invention, the chemical composition of the electrode wire constituting the leading electrode or electrode group is selected to differ from that of the electrode wire constituting the trailing electrode or electrode group. More specifically, when electrode wires are used whose chemical compositions are equivalent to or low in alloy content relative to the base metal, the electrode wire constituting the trailing electrode or electrode group has a high alloy composition relative to that of the electrode wire constituting the leading electrode or electrode group, whereas when electrode wires are used whose chemical compositions are high in alloy content relative to that of the base metal the electrode wire constituting the trailing electrode or electrode group has a low alloy composition relative to that of the electrode wire constituting the leading electrode or electrode group.

BRIEF DESCRIPTION OF THE DRAWING

FIGS. 1a and 1b are schematic diagrams showing dilution of the weld metals made by the respective passes.

FIG. 2 is a schematic diagram showing the groove shape and the locations of the notches formed in the Charpy test specimens used in the examples of this invention.

DETAILED DESCRIPTION OF THE INVENTION

The investigations made by the inventors, have shown that the above-mentioned wide variation in the chemical composition of the weld metals made by the respective passes in the multiple electrode gas shielded arc welding is caused for two reasons, namely, one is the dilution of the weld metal with the base metal and the other is the promotion of the deoxidation reactions by the preheating effect due to the use of a plurality of electrodes. Referring first to the problem of dilution, if, for example, two steel plates are placed edge to edge to form a single Vee groove with a broad root face and these are welded together with two passes, because of a difference in the depth and width of the groove between the first and second passes, the area of the groove face that will be melted by the first pass is greater than in the case of the second pass with a resultant difference in the degree of dilution of the weld metal with the base metal. Namely, the rate of dilution of the weld bead layer made by the first pass will be greater than that of the weld bead layer made by the second pass. Consequently, even if the same welding electrode material is used for both the first and second passes, the chemical composition of the weld metal of the respective layers differs from one another depending on their positions in the direction of the groove depth. Furthermore, the base metal and the welding material contain alloying elements such as C, Mn, Si, Cr, Al, Ti, Zr and B which have a high affinity to oxygen (the contents of these elements are high in high quality steels such as high tension steels and low temperature steels). As a result, during the welding, such alloying elements combine with oxygen in the air around the arc and the shielding gas and produce deoxidation products or gases which in turn float to the surface of the beads or remain in weld metal as the inclusions. Since, in view of the above-mentioned difference in the rate of dilution, the contents of these elements in the second and subsequent layers tend to become closer to those in the deposited metal made only by the welding electrode material and thus these elements are contained in different amounts in the respective layers, the relative relation between the amount of the elements lost as slag or inclusions due to the reactions and the rest of the elements which remain in the weld metal as solid solution elements or forms carbides and nitrides to constitute component parts which control the properties of the weld metal are not the same throughout the respective layers deposited by the multi-layer welding process. More strictly, the weld metals of the superposed layers consist of the alloys of different compositions and therefore it is impossible to expect the homogeneous properties throughout the entire weld metal. Additionally the base metal and the welding electrode material also contain, in addition to the above-mentioned alloying elements having a high oxygen affinity, other alloying elements such as Ni and Mo having a low oxygen affinity and these elements are also affected by the dilution independently of the above-mentioned reactions with oxygen (e.g., deoxidation, oxidation and combination). Namely, due to a difference in the degree of the dilution with the base metal of the welding electrode material deposited by the respective passes, there results a variation in the amounts of the elements supplied by the respective passes and consequently the properties of the weld metal at the different positions differ from one another.

The problem of promoted deoxidation reaction due to the effect of preheating is as follows. That is, while the above-mentioned deoxidation reaction takes place when the globule from the forward end of the electrode wire melted by the arc passes through the arc, before the globule solidifies in the molten pool and partly after the solification, the deoxidation reaction tends to be promoted considerably as the welding heat input is increased and the preheating temperature of the base metal and the interlayer temperature thus maintaining the weld metal at an elevated temperature for a longer period of time. This tendency is particularly noted in the case of a continuous multi-layer welding by the multiple electrode welding process the deoxidation reaction during the welding by the following pass is promoted to an increased degree due to the effect of preheating by the heat energy caused by the leading electrode and consequently, the weld metal made by the following pass loses an increased amount of the alloying elements.

Thus, where the base metal contains large amounts of alloying elements, as in the case of high tension steels and low temperature steels, and the multi-layer welding of the base metal is accomplished by the multiple electrode automatic gas shielded arc welding process, due to the combined action of the above-mentioned two effects, i.e., the preheating effect and the effect due to the difference of dilution rate, there results a still greater variation in the chemical composition of the weld metal in the layers deposited by the respective passes and this in turn results in a greater non-uniformity in the properties of the weld metal of the respective layers in the entire weld metal.

The present invention has been made on this discovery and it will be described in greater detail with reference to the accompanying drawings.

FIGS. 1a and 1b are schematic diagrams showing the dilution of the weld metals made by the respective passes, and FIG. 2 shows the shape of the groove and the location of a notch formed in the Charpy test specimens used in the examples of the invention.

In the multi-layer welding, the dilution rate showing the extent in which a certain alloying element of the welding electrode wire in the weld metal is diluted with the base metal differs depending on the position of the layers in the weld metal, and the dilution rate of the second and subsequent layers becomes increasingly smaller as compared with that of the first layer, namely, the alloy contents become closer to those in the weld metal made by the electrode wire alone. This may be explained briefly with reference to FIGS. 1a and 1b showing by way of example the case of welding two steel plates with two passes. Referring to FIG. 1a showing the weld metal made by the first pass, assuming that A represents the cross-sectional area of the base metal portion in the weld zone by the first pass and B represents the cross-sectional area of the deposited metal portion in the weld zone by the first pass, the resulting dilution rate P for the first pass is given as follows $$P = A/A + B$$

On the other hand, with the second pass weld metal shown in FIG. 1b, assuming that A' represents the cross-sectional area of the base metal portion in the metal zone by the second pass and B represents the cross-sectional area of the deposited metal portion in the weld zone by the second pass, the resulting dilution rate P' is given as follows $$P' = A'/A' + B'$$

Thus, if the deposition efficiency is the same for both the first and second passes, then there results a relation $P > P'$ since the depth and width of the groove are not the same for the two passes as mentioned earlier.

With the gas shielded arc welding method of this invention, the essential requirement is to use two or more electrode wires. It is not essential whether the electrode wires are of a large diameter or of a small diameter. As regards the welding current, either the large current system and the small current system may be used. Further, there is no specific requirements for the arc voltage and welding speed and the same conditions as used in the ordinary multiple electrode gas shielded arc welding process may be used. Still further, there is no specific limitation to the types of shielding gas, namely, any pure gas such as pure argon or pure carbon deoxide gas or a mixed gas formed by introducing a predetermined amount of oxygen or carbon dioxide into argon may be used and the flow rate of the shielding gas may also be the same as the usual flow rate.

A feature of the present invention resides in that the chemical composition of the plurality of electrode wires is selected in such a manner that there is a difference in chemical composition between the leading electrode or electrode group and the trailing electrode or electrode group and thus the two electrodes or electrode groups have different chemical compositions. The manner in which the chemical composition of the electrode wire constituting the leading electrode or electrode group is selected to differ from that of the electrode wire constituting the trailing electrode or electrode group depends on the amounts of deoxidizing alloying elements contained in the base metal and the welding materials (electrode wires) and the degree by which the elements contained in the weld metal filled in the weld zone by the electrodes and having a low oxygen affinity are diluted with the base metal independently of the deoxidation reaction process. In other words, it is suitably selected depending on whether the chemical compositions of the electrode wires are low or high in alloy content relative to the base metal.

For instance, where the chemical compositions of the electrode wires are equivalent to or low in alloy content relative to the base metal, an electrode wire having a high alloy composition relative to that of the electrode wire constituting the leading electrode or electrode group is selected for the trailing electrode or electrode group. In this way, it is possible to accurately control the amounts of the deoxidizing elements in the weld metal deposited by the preceeding and following passes, respectively, so that the deoxidation reaction of the elements deposited by the preceeding pass and having a higher dilution rate than in the case of the following pass is promoted, whereas the deoxidation reaction of the elements deposited by the following pass and preheated by the heat energy of the leading electrode or electrode group is restrained, thus bringing the chemical composition of the weld metal deposited by the preceeding and following passes, respectively, near to each other. As regards the elements having a low oxygen affinity, by using the high alloy trailing electrode it is possible to accurately compensate the alloying elements lost in the weld metal deposited by the following pass and it this way the chemical composition of the weld metal made by each of the passes may be brought near to each other.

On the other hand, where the chemical compositions of the electrode wires are high in alloy content relative to that of the base metal, an electrode wire having a low alloy composition relative to that of the electrode wire constituting the leading electrode or electrode group is selected for the trailing electrode or electrode group and in this way the amounts of the deoxidizing elements and the amounts of the non-deoxidizing elements in the weld metal deposited by each of the passes may be accurately controlled.

The following examples describe in greater detail the welding operation in accordance with the method of this invention in comparison with the conventional method.

EXAMPLE 1

Using a thick base metal having the plate thickness and the groove conditions shown in FIG. 2, the multiple electrode automatic gas shielded arc welding of the base metal was accomplished. The chemical compositions of the electrode wires and the base metal used in this welding are shown in Table 1. The welding conditions were as follows.

i. The electrode wire diameter: 4 mm$\phi$ for both leading and trailing electrodes ii. Current × voltage × welding speed: preceeding pass, 800A × 30V × 600mm/min following pass, 760A × 31V × 600 mm/min iii. Shielding gas: Ar + $CO_2$ (15% $CO_2$ for both leading and trailing electrodes)

The following Table 2 shows the test results on the product obtained by using the same type of wire for both the leading and trailing electrodes (the conventional method) and the product obtained by using different types or wire for the leading and trailing electrodes (the method of this invention) with the above-mentioned welding conditions and chemical compositions.

Table 1
Chemical composition (%)

| | |
|---|---|
| Electrode wire A | C, 0.10; Si, 0.35; Mn, 2.00; P, 0.015; S, 0.015; Ti, 0.10 |
| Electrode wire B | C, 0.10; Si, 0.35; Mn, 1.00; P, 0.015; S, 0.015; Ni, 1.09; Mo, 0.10; Ti, 0.25; B, 0.015; Al, 0.03 |
| Electrode wire C | C, 0.10; Si, 0.35; Mn, 2.00; P, 0.015; S, 0.015; Ni, 3.10; Mo, 0.30; Ti, 0.10; Al, 0.015 |
| Base metal | C, 0.08; Si, 0.30; Mn, 0.30; Cr, 0.50; P, 0.010; S, 0.010; Al, 0.04; Ti, 0.03 |

Table 2

| | | Conventional method | No. 1 method of the invention | No. 2 method of the invention |
|---|---|---|---|---|
| Type of electrode wire | | Leading electrode A Trailing electrode A | Leading electrode A Trailing electrode B | Leading electrode A Trailing electrode C |
| VE - 80° C (Kg.m) | N1 | 8.5 | 8.7 | 8.5 |
| | N2 | 2.4 | 9.3 | 12.0 |

(Notes):
The standard Charpy test specimens of 2 mm V-notch were used for the Charpy tests. In the Table, N1 and N2 respectively represent the case wherein the notch was formed in the weld metal largely made by the first pass and the case wherein the notch was formed in the metal weld largely made by the second pass as shown in FIG. 2.

As will be seen from the above Table 2, in accordance with the method of this invention the properties of the respective layers in the entire weld metal can be made uniform as compared with the conventional method. In addition, where the electrode wires of low alloy compositions relative to the base metal are to be used, an electrode wire of a high alloy composition relative to the electrode wire constituting the leading electrode may be selected for the trailing electrode to thereby bring the impact values of the weld metals made by the respective passes close to each other. The excellent properties shown by the NO. 1 test specimen of the invention were obtained through the control of the combination of Ti, B and Al with oxygen, while the excellent properties shown by the NO. 2 test specimen of the invention were obtained mainly by the fact that the elements Ni, Mn and Mo were added independently of the reaction with oxygen to make up for the shortage of these elements.

EXAMPLE 2

Using the same conditions as Example 1 except for the base metal having a chemical composition (%) : C, 0.07; Si, 0.23; Mn, 0.54; P, 0.013; S, 0.006; Ni, 3.45, the multi-layer welding of the base metal was accomplished. The following Table 3 shows similar test results as for Example 1.

Table 3

| | | Conventional method | No. 3 method of the invention | NO. 4 method of the invention |
|---|---|---|---|---|
| Type of electrode wire | | Leading electrode C Trailing electrode C | Leading electrode C Trailing electrode B | Leading electrode C Trailing electrode A |
| VE - 80° C (Kg.m) | N1 | 12.0 | 11.8 | 11.7 |
| | N2 | 4.2 | 6.5 | 13.2 |

While the above Table 3 shows the test results on the products obtained by using the high alloy electrode wires relative to the base metal, it will be seen that also in this example, the method of this invention is highly effective as compared with the conventional method in making the properties of the respective layers uniform in the weld metal.

It will thus be seen that in accordance with the present invention, the multiple electrode gas shielded arc welding is accomplished by controlling the chemical compositions of the electrode wires constituting the leading electrode or electrode group and the subsequent trailing electrode or electrode group, and in this way the deoxidation reactions can be controlled as desired to bring the chemical compositions of the weld metals made by the respective passes close to one another and thereby to making the properties of the respective layers in the entire weld metal uniform. Thus, the method of this invention has a very great industrial utility as an arc welding process for high quality steels of thick gages.

What is claimed is:

1. A method of effecting multiple electrode gas shielded arc welding comprising depositing weld metal in a plurality of layers with a leading electrode or electrode group and a trailing electrode or electrode group; said leading electrode or electrode group being made of an electrode wire having a chemical composition with different amounts of deoxidizing elements from that of the electrode wire constituting said trailing electrode or electrode group such that the properties of the plurality of layers are made substantially uniform.

2. A method of effecting multiple electrode gas shielded arc welding comprising depositing weld metal in a plurality of layers with a leading electrode or electrode group and a trailing electrode or electrode group, said leading electrode or electrode group being made of an electrode wire having a chemical composition different from that of the electrode wire constituting said trailing electrode or electrode group such that the properties of the plurality of layers are made substantially uniform, the chemmical compositions of said electrode wires being equivalent to or low in alloy content relative to that of the base metal to be welded, the chemical composition of the electrode wire constituting the trailing electrode or electrode group being different from that of the leading electrode or electrode group by having a relatively high alloy content compared to the electrode wire constituting the leading electrode or electrode group.

3. A method of effecting multiple electrode gas shielded arc welding comprising depositing weld metal in a plurality of layers with a leading electrode or electrode group and a trailing electrode or electrode group, said leading electrode or electrode group being made of an electrode wire having a chemical composition different from that of the electrode wire constituting said trailing electrode or electrode group such that the properties of the plurality of layers are made substantially uniform, the chemical compositions of the electrode wires being high in alloy content relative to that of the base metal to be welded, the chemical composition of the electrode wire constituting the trailing electrode or electrode group being different from that of the leading electrode or electrode group by having a relatively low alloy content compared to the electrode wire constituting the leading electrode or electrode group.

* * * * *